United States Patent
Wasko

[11] 3,802,977
[45] Apr. 9, 1974

[54] METHOD OF RETREADING TIRES
[75] Inventor: Elmer J. Wasko, Wadsworth, Ohio
[73] Assignee: The Goodyear Tire & Rubber Company, Akron, Ohio
[22] Filed: Nov. 12, 1971
[21] Appl. No.: 198,280

[52] U.S. Cl............... 156/96, 156/128, 156/394
[51] Int. Cl........................... B29h 5/04, B29h 17/16
[58] Field of Search........ 156/128 R, 113, 129, 127, 156/110, 394, 96, 97, 98, 94, 394 FM

[56] References Cited
UNITED STATES PATENTS

| | | | |
|---|---|---|---|
| 1,483,857 | 2/1924 | Fitzharris | 156/394 FM |
| 2,501,577 | 3/1950 | Pfeiffer | 156/394 FM |
| 2,434,156 | 1/1948 | Heintz | 156/96 |
| 3,127,460 | 3/1964 | Freeman | 156/394 FM |
| 2,802,506 | 8/1957 | Agle et al. | 156/97 |
| 3,190,338 | 6/1965 | Wolfe | 156/97 |

FOREIGN PATENTS OR APPLICATIONS

| | | | |
|---|---|---|---|
| 555,680 | 9/1943 | Great Britain | 156/96 |
| 556,598 | 10/1943 | Great Britain | 156/97 |
| 746,375 | 3/1956 | Great Britain | 156/96 |
| 672,372 | 5/1952 | Great Britain | 156/113 |

Primary Examiner—Clifton B. Cosby
Attorney, Agent, or Firm—F. W. Brunner; H. E. Hummer

[57] ABSTRACT

A method of retreading using a previously vulcanized tread which is cemented on the buffed periphery of a tire casing. It is necessary to vulcanize the adhesive used in cementing the precured tread to the tire casing. A specially configured bag, covering the precured tread, is inflated with steam for heating and vulcanizing the adhesive to permanently cement the tread on the tire casing.

19 Claims, 7 Drawing Figures

METHOD OF RETREADING TIRES

BACKGROUND OF THE INVENTION

The invention is particularly well suited for use in retreading non-deflatable tires filled with foamed synthetic rubber. In such cases, it is desirable to use a previously vulcanized tread rather than a tread composed of unvulcanized rubber, simply because such tires cannot be demounted from their rims, and conventional retreading molds are not designed to accommodate rims. Moreover, it is necessary to move an unvulcanized tread into the matrix of the mold to form the ribs and grooves of the tread, and this is not possible when the tire is filled with foamed rubber.

Most methods, presently employed for retreading a tire with a vulcanized tread, utilize a complex rubber cover and wheel rim assembly for sealing the tire from steam, hot air, or hot water, which are generally used for vulcanizing the adhesive between the precured tread and tire casing. Such methods are usually very cumbersome and time consuming because of the techniques involved in sealing the tire from the heated medium used for vulcanizing the adhesive. The invention is directed to an improved method of vulcanizing the adhesive for cementing the vulcanized tread to the tire casing.

Briefly stated, the invention is in a method of retreading a buffed tire casing suitable for retreading. A previously vulcanized or precured tread is located on the buffed periphery of the tire casing in contact with an adhesive which is interposed between the precured tread and buffed periphery. The adhesive is uncured and must be heated and vulcanized to cement the precured tread on the tire casing. An inflatable curing tube is stuffed within the cavity of the tire casing. A standard cylindrical curing rim is used for restricting the inflation of the curing tube within the tire cavity, such that the curing tube, upon inflation, compresses against the inner crown of the tire casing. An inflatable bag, configured for covering the precured tread, is then placed around the tire casing. The bag is inflated with a heated medium for vulcanizing the adhesive. The inflation of the bag is restricted, such that the bag, upon inflation, compresses the precured tread firmly against the buffered periphery of the tire casing.

DESCRIPTION OF THE DRAWING

The following description of the invention will be better understood by having reference to the annexed drawing, wherein.

DESCRIPTION OF THE INVENTION

Figure 1:
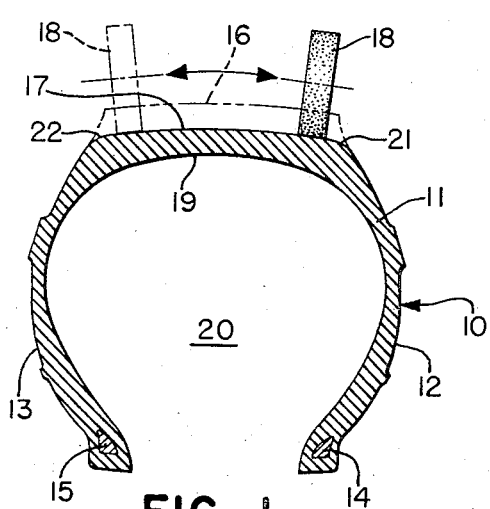
FIGS. 1–5 are cross-sections of a conventional pneumatic tire illustrating the sequential operations used in retreading the tire with a precured tread in accordance with the invention.

Referring generally to the drawing, and more particularly to FIG. 1, there is shown a tire casing 10 comprising a toroidally shaped carcass 11, having an outer exposed pair of sidewalls 12 and 13 terminating in a pair of annular beads 14 and 15. A worn or imperfect tread 16 is removed from the outer periphery 17 of the tire casing 10 by any suitable means, e.g. grinding with a rotating abrasive wheel 18 which traverses the outer periphery 17 as the tire casing 10 rotates about its center axis (note abrasive wheel 18 in dotted position). The tire casing 10 also includes an inner crown 19 in opposite spaced relation from the outer buffed periphery 17, and a cavity 20 for receiving air under pressure. The tire casing 10 is buffed until a sufficient amount of rubber has been removed, especially in the areas of the shoulders 21 and 22, which have been found to be more critical than other buffed areas of the tire casing 10.

Figure 2:
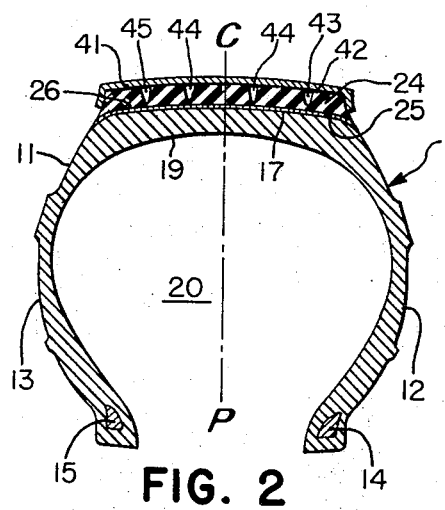

A tread 24 (FIG. 2), previously cured at a temperature preferably in the range of from 275°F. to 325°F. under a given pressure, e.g., 230–250 p.s.i. (pounds per sq. in.), is centrally located on the outer buffed periphery 17 in relation to a centerplane CP containing the mid-circumferential centerline of the original tread 16. The precured tread 24 is in contact with an adhesive 25 interposed between the precured tread 24 and outer buffed periphery 17 of the tire casing 10. The adhesive 25, in this case, is a combination of a liquid cement sold by The Goodyear Tire & Rubber Company of Akron, Ohio, under the trademark "NYLO-BOND," and any appropriate unvulcanized gum rubber, e.g., the gum rubber described in U.S. Pat. No. 3,136,673. However, the adhesive 25 may be any suitable uncured material which must be heated and cured to cement the precured tread 24 to the tire casing 10. The aforementioned cement is applied to the buffed periphery 17 and adjacent inner peripheral surface 26 of the precured tread 24 which is roughened by buffing for receiving the cement. The gum rubber may be applied to either the buffed periphery 17 of the tire casing 10, or the precured tread 24.

Figure 3:
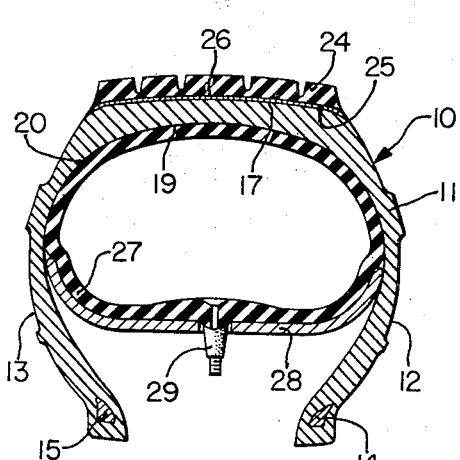

An inflatable curing tube 27 (FIG. 3), composed of any suitable material, e.g., rubber, is stuffed within the tire cavity 20. A rigid cylindrical ring, e.g., a standard curing rim 28, is provided for restricting inflation of the curing tube 27 within the tire cavity 20, such that the curing tube 27 will compressibly engage, and exert radial pressure outwardly against, the inner crown 18 of the tire casing 10. The curing rim 28 is preferably formed from a number of arcuate sections which are secured together and extend into the tire cavity 20 terminating in spaced relation from the inner crown 19 of the tire casing 10. Air, under pressure, is pumped into the curing tube 27 through a valve 29 extending through the curing rim 28.

Figure 4:
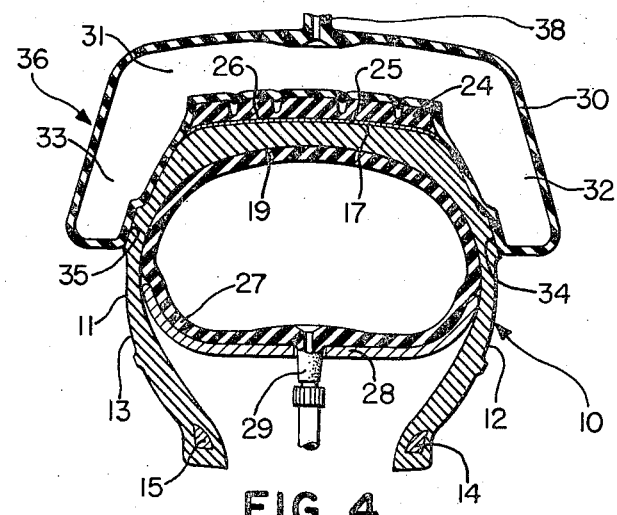

An inflatable bag 30 (FIG. 4), preferably composed of any appropriate steam resistant rubber, is used for covering the precured tread 24. The bag 30 is inflated with a heated medium, e.g., steam, for heating and vulcanizing the adhesive 25 to cement or anchor the precured tread 24 firmly on the outer buffed periphery 17 of the tire casing 10. The bag 30 has a generally U-shaped configuration including an inflatable base 31 with outstanding inflatable legs 32 and 33 which preferably cover, and extend beyond the joints 34 and 35 between the precured tread 24 and tire casing 10.

Figure 5:
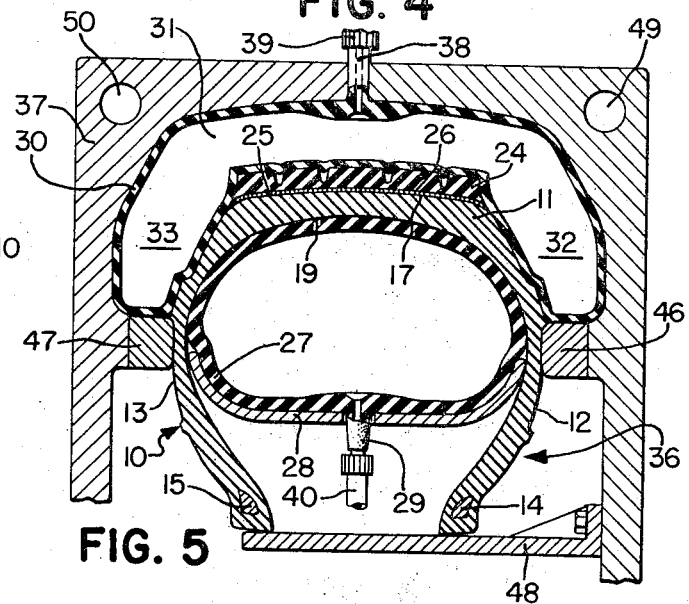

The tire casing 10, attached precured tread 24, covering bag 30, curing tube 27, and rim 28 form a retread tire assembly 36 which is then placed in a mold 37 (FIG. 5) which acts to restrict the inflation of the bag 30 such that the bag 30, when inflated, compresses the precured tread 24 against the tire casing 10 until the adhesive 25 is vulcanized. The air pressure within the curing tube 27 should be maintained from 15–30 p.s.i. greater than the air pressure in the outer bag 30 to prevent collapse of the tire casing 10 during the adhesive curing operation. An inlet valve 38 of the inflatable bag 30, extends outwardly through the mold 37 and is attached to a convenient steam line 39 for bringing steam, preferably at a temperature of from 275°F. to 325°F., to inflate the bag 30. An outlet valve (not shown) is provided for removing steam and any condensate from the bag 30 and is angularly spaced 180° from the inlet valve 38. Similarly, the air valve 29 of the curing tube 27, is attached to a conventional air line 40 for bringing air, under pressure, to inflate the curing tube 27. Thus, the precured tread 24 and tire casing 10 are firmly pressed together while the adhesive 25 is curing.

The bag 30 is comparatively rigid in order to accommodate the steam. Therefore, it is generally contoured to approximate the curvature of the tread as well as the transverse configuration of the tread and adjacent sidewall portions of the tire casing. Thus, when the bag 30 is inflated, it will contact the precured tread 24 and adjacent portions of the sidewalls 12 and 13 to insure properly heating and curing the adhesive 25.

A thin rubber sheet 41 (FIG. 2) may be used to cover the outer grooved periphery 42 of the precured tread 24, prior to mounting the bag 30 on the tire casing 10. The rubber covering 41 helps protect the bag 30 by keeping the bag 30 from being forced into the grooves 43–45 of the precured tread 24. The curing tube 27 may be provided with electric heating coils on its periphery contacting the inner crown 19 of the tire casing 10, to speed up vulcanization of the adhesive 25.

The mold 37 is composed of two halves and has a smooth inner periphery for contacting the curing bag 30. The mold 37 is also provided with a pair of sidewall rings 46 and 47 for engaging the tire casing 10 to prevent the bag 30, when inflated, from blowing out through the spaces between the mold 37 and sidewalls 12 and 13 of the tire casing 10. A lock-type fitting is used for holding the sidewall rings 46 and 47 to the mold 37. Similar rings 46 and 47 with different widths are used to accommodate correspondingly sized tires in the mold 37. A number of similar posts 48 are equally spaced from, and about, the center axis of the mold 37.

The center posts 48 extend from one side of the mold 37 for engaging the tire beads 14 and 15 to center the tire casing 10 within the mold 37. The sidewall rings 46 and 47 also help position the tire casing 10 in the mold 37. Standard steam coils 49 and 50 are provided in the mold 37 for preheating the mold and preventing dissipation of the heat from the bag 30 into the surrounding areas of the mold 37 contacting the bag 30.

Figure 6:
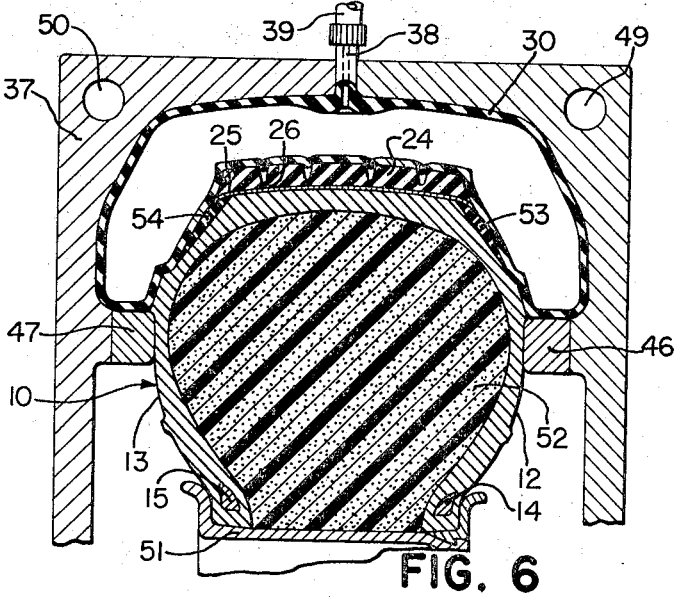
FIG. 6 is a cross-section of a foam-filled tire in a mold in which the adhesive is vulcanized.

The mold 37 is designed to accommodate a tire casing 10 (FIG. 6) mounted on a standard rim 51 and filled with foamed synthetic rubber 52. It can be appreciated that the curing tube 27 cannot be used in such cases. However, the foamed rubber 52 is sufficient to maintain the toroidal shape of the tire casing 10 and prevent collapse of the tire casing 10 during curing of the adhesive 25. For illustrative purposes, a pair of previously vulcanized sidewall pieces 53 and 54 are similarly cemented on the tire casing 10. The sidewall pieces 53 and 54 generally extend from the precured tread 24 to the scuff ribs of the tire casing 10. The curing bag 30 is designed to cover the sidewall pieces 53 and 54, as well as the precured tread 24. Again, this is done to insure proper heating and vulcanization of the adhesive which, when vulcanized, anchors the tread 24 and pieces 53 and 54 firmly on the tire casing 10.

Figure 7:
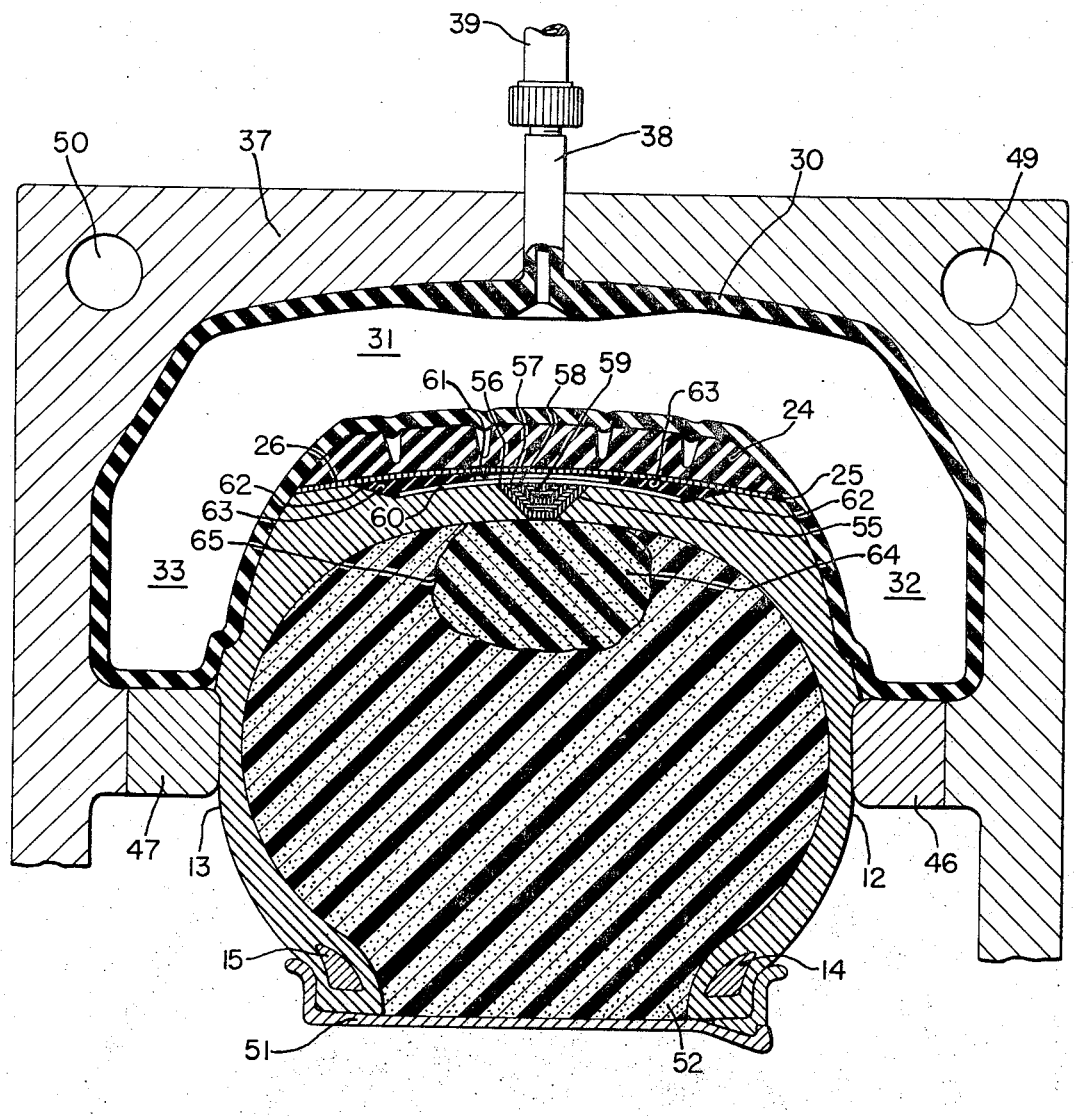
FIG. 7 is a cross-section of another foam-filled tire in a mold showing a patched area in the casing.

FIG. 7 illustrates patching a defective area or opening 55 in a tire casing 10 filled with foamed synthetic rubber 52. The opening 55 is preferably filled with strips 56–59 of standard all-purpose, unvulcanized gum rubber which are layered within the opening 55. A plurality of patch plies 60 and 61, composed of rubberized, parallel textile or metallic tire cords, are placed in criss-cross fashion over the opening 55 and within a recess 62 which is buffed in the casing 10 for receiving the patch plies 60 and 61. The first patch ply 60, closest the casing 10, is positioned such that the tire cords reinforcing the ply 60 are in axial alignment with the reinforcement cords of the closest carcass ply or belt ply, whichever the case may be. Conventional unvulcanized filler gum 63 is used for filling the recess 62 above the patch plies 60 and 61 to provide a solid rubber base for the precured tread 24.

Uncured, unfoamed, foamable synthetic rubber 64 may be used for replacing a defective portion of the foamed synthetic rubber 52, such material being stuffed into the void or cavity 65 prior to filling the opening 55. The aforementioned assembly is similarly covered with a curing bag 30, placed in a mold 37, and heated to cure the various unvulcanized components, as previously described. The foamed rubber 52, being under pressure within the tire casing 10, has a tendency to push outwardly through the opening 55 and cause a bump in the normally circular periphery of the tire. This problem is eliminated by inflating the curing bag 30 to an internal pressure which is greater than the internal pressure of the foamed rubber 52. Thus, the force exerted by the bag 30 against the precured tread 24, is sufficient to keep the foamed material within the cavity 20 of the casing 10.

Thus, there has been provided an improved method for retreading a buffed tire casing with a precured tread. The method is especially suitable for over-the-road truck tires and non-deflatable tires filled with foamed synthetic rubber and comparable in size to the truck tires. The process of retreading tires with the aforementioned equipment has been improved and speeded up considerably, for example, from 4–5 hours, using certain presently known methods, to 1–2 hours for the same size tire using the above-described method.

What is claimed is:

1. A method of retreading a tire, including a tread and casing with a pair of sidewalls, comprising the steps of:
   a. buffing the outer periphery of the casing to at least partially remove the tread of the tire;
   b. locating a previously cured tread on the buffed periphery in contact with an uncured adhesive interposed between the precured tread and periphery, the adhesive being cured when heated by a medium and, when cured, firmly anchoring the precured tread to the casing;
   c. covering the previously cured tread and juncture between the tread and tire casing with a fluid impervious inflatable bag which, prior to inflation, has a generally U-shaped cross-section and a pair of annular inflatable legs that extend from the tread along opposing sides of the precured tread and beyond the juncture of the precured tread and tire casing;

d. placing the assembly of the tire and bag into a mold-like apparatus comprising two sections which, when closed, form a cavity for receiving the assembly, the apparatus including an annular stop projecting from at least one of the sections for effecting an annular seal with the adjacent sidewall of the tire in radially spaced relation from the juncture of the precured tread and tire casing;

e. exerting a predetermined fluid pressure against the inner crown of the tire casing in the direction of the tread; and f. inflating a bag with a heated medium for curing the adhesive, the bag engaging the stop and apparatus as it inflates and being restricted thereby such that it compressibly engages the precured tread and tire casing adjacent the tread.

2. The method of claim 1, wherein the step (e) of exerting fluid pressure includes:

g. placing an inflatable elastomeric curing tube within the cavity of the casing; and h. restricting inflation of the tube within the cavity, such that the tube, upon inflation, presses against the inner crown of the casing.

3. The method of claim 2, wherein step (h) of restricting inflation of the tube includes placing a curing rim within the cavity in spaced relation from the inner crown of the casing, after the tube is placed within the cavity, for restricting inflation of the tube.

4. The method of claim 1, wherein the medium is steam at a temperature of from 275°F. to 325°F.

5. The method of claim 4, wherein the bag is composed of steam resistant rubber.

6. The method of claim 1, wherein the casing, being retreaded, is mounted on a rim and filled with foamed synthetic rubber.

7. The method of claim 6, which includes, prior to locating the precured tread on the buffed periphery of the casing, the steps of:

g. placing uncured rubber material in an opening in the buffed periphery of the casing; and h. covering the opening filled with uncured rubber material with a plurality of patch plies, each ply composed of rubberized parallel tire cords, the tire cords of adjacent plies being oriented at different angles measured in the same direction from a centerplane containing the mid-circumferential centerline of the buffered periphery of the casing.

8. The method of claim 7, wherein the closest reinforcement cords of the patch plies and casing, are oriented at similar angles with respect to said centerplane.

9. The method of claim 8, which includes the step of:

i. placing uncured rubber material over the patch plies to fill a recess formed when the casing in the area of the opening is additionally buffed for receiving the patch plies without causing a bump in the buffed periphery of the casing.

10. In combination:
a. a tire casing having an outer buffed periphery;
b. a precured tread positioned in surrounding relation around the outer buffed periphery of the tire casing;

c. an uncured adhesive disposed between the precured tread and periphery for anchoring the precured tread to the casing when the adhesive is cured, the adhesive being cured when heated by a medium;

d. means within the cavity of the tire casing for exerting a fluid pressure against the inner crown of the tire casing in the direction of the tread;

e. a fluid impervious inflatable bag covering the precured tread, the bag, prior to inflation, having a generally U-shaped cross-section and inflatable legs that extend from the tread along opposing sides of the precured tread and beyond the juncture of the precured tread and tire casing;

f. means for inflating the bag with a heated medium for curing the adhesive; and g. means for restricting inflation of the bag such that the bag, when inflated, presses the precured tread against the tire casing, said restricting means including:

I. a mold-like apparatus having two sections which, when closed, form a cavity for receiving the tire and bag, each section including a closure plate and an outstanding cylindrical casing extending from the plate; and II. an annular stop projecting from the closure plate of at least one of the sections of the apparatus in radially spaced relation from the outstanding cylindrical casing of the section carrying the stop, for effecting an annular seal with an adjacent sidewall of the tire in radially spaced relation from the juncture of the precured tread and tire casing.

11. The combination of claim 10, wherein the means (d) includes an inflatable curing tube and a curing rim for restricting inflation of the tube within the cavity of the tire casing.

12. The combination of claim 11, wherein the bag includes an inflatable base adjacent the outer periphery of the precured tread and integrally formed with the pair of inflatable legs.

13. The combination of claim 12, wherein the means (f) includes means for inflating the bag with steam at a temperature in the range of from 275°F. to 325°F.

14. The combination of claim 13, wherein the bag is composed of steam resistant rubber.

15. The combination of claim 10, wherein the means (d) includes foamed rubber within the cavity of the tire casing.

16. The combination of claim 10, which includes a pair of previously cured sidewall pieces extending from the precured tread, and similar uncured adhesive interposed between the pieces and tire casing.

17. The combination of claim 10, which includes a pair of sidewall rings positioned in the space between the means (g) and sidewalls of the tire casing.

18. The combination of claim 10, which includes a plurality of arcuately spaced posts engaging beads of the tire casing and centering the tire relative to an axis normal to a plane containing the mid-circumferential centerline of the precured tread.

19. The combination of claim 10, wherein means (g) includes a mold having a smooth inner peripheral surface for contacting the bag.

* * * * *